Dec. 13, 1927.

G. A. BURD

BEDPAN

Filed Nov. 15, 1926

1,652,467

INVENTOR
GRACE ANNA BURD
BY
ATTY.

Patented Dec. 13, 1927.

1,652,467

UNITED STATES PATENT OFFICE.

GRACE ANNA BURD, OF COLFAX, CALIFORNIA.

BEDPAN.

Application filed November 15, 1926. Serial No. 148,463.

My invention relates to improvements in bed pans wherein a shield is mounted across the forward portion of the pan to prevent soiling of sheets and bedding.

As is well known, persons in attendance upon bed ridden patients are subjected to great annoyance and extra labor and laundry expense due to the soiling of bed linen and bedding by the use of bedpans of the form heretofore commonly provided. This is due partly to the spilling or splashing of the contents of the pan upon the bedding, and partly to the fact that the bedding often drops into the pan when said pan is being removed from the bed. The primary object of my present invention is, therefore, to provide an improved bed pan which will effectually protect the bedding from such soiling.

Another object is to provide a bed pan provided with an improved shield arranged to prevent the spilling or splashing of the contents of the pan from the front thereof, and which extends above the pan to a height sufficient to prevent the bedding from falling into the pan.

A further object is to provide an improved bed pan which may be easily lifted and transported.

A still further object is to provide a device of the character described which may be readily opened for cleaning.

Figure 1:
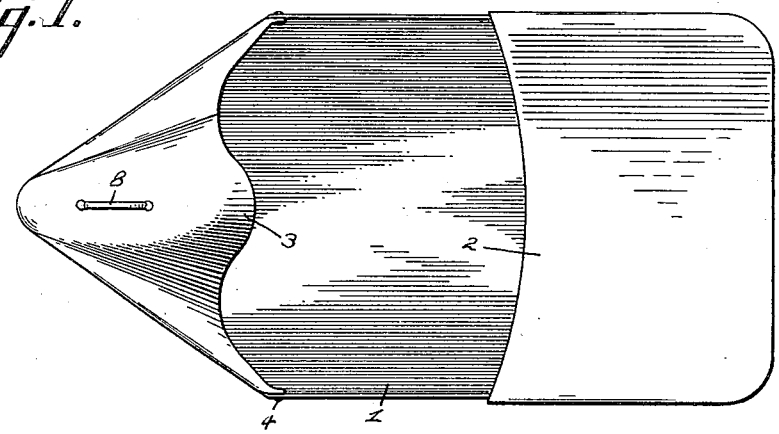
Figure 2:
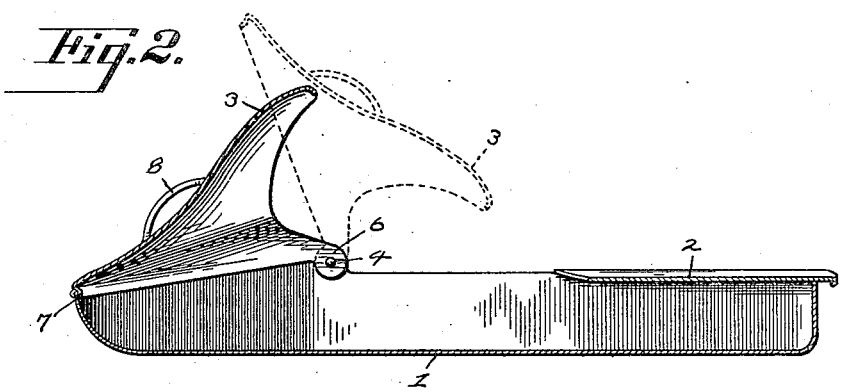

I accomplish these and other objects by means of the improved device disclosed in the drawings forming a part of the present application wherein like characters of reference are used to designate similar parts throughout the specification and drawings, and in which, Fig. 1 is a plan view of my improved bed pan, Fig. 2 is a longitudinal vertical section of the pan.

Referring to the drawings, the numeral 1 is used to designate in general the body of a bed pan having a seat portion 2 extending across the rear end of the pan, said pan and seat being of a size and shape suited for use by bed ridden patients in the well known manner.

Across the front of the pan is arranged a shield portion 3 open across the back and converging upwardly around the front and sides in substantially semi-conical form to a point substantially above the form of the pan. The shield is preferably constructed as a separate member pivotally connected to the sides of the pan by means of suitable pivot pins 4 carried by extensions 6 engaging the outer sides of the pan. A flange 7 is arranged to fit closely within the edge of the pan 1 around the front edge thereof whereby the front of the pan is fully closed. A handle 8 is secured upon the front of the shield 3 at a point forward from the pivot mountings 4 whereby the weight of the pan will operate to hold said pan in closed relation with the shield when lifted by the handle.

In operation, the pan is placed and used in the well known manner. The shield does not interfere with the normal use of the pan, and by extending upwardly and closing the front edge of the pan operates to effectually prevent splashing from the pan and to prevent spilling of the contents of the pan when removed from a bed. The height of the shield is made sufficient to effectually hold bedding, not shown, about the pan and to prevent any portion of the bedding from sagging or falling into the pan. The shield 3 is tipped rearwardly upon the pivot pins 4 from the normal position shown in full lines to the position indicated in dotted lines in Fig. 2 of the drawings to facilitate the emptying and cleaning of the pan.

The pan 1 and the seat 2 and shield 3 are constructed of sheet metal, or other suitable material and may be finished in any desired manner.

The size, and the relative size and shape of the parts may, of course, be designed to suit any requirement, and the details of construction may be modified in numerous ways without departing from the spirit of my invention. I, therefore, do not wish to restrict myself to the specific form and construction illustrated and described, but desire to avail myself of all modifications which may fall within the scope of the appended claims.

Having thus described my invention what I claim as new and desire to secure by Letters Patent is,

1. A bed pan comprising a body portion; a seat extending across the rearward portion of the body; a shield pivotally mounted upon the front portion of the body; and a handle mounted upon the front of the shield, said handle being arranged in front of the pivot mounting of the shield whereby the body and shield will be held in closed relation by the weight of the pan when the pan is lifted by said handle.

2. A bed pan comprising a body portion; a seat extending across the rearward portion of the body; and a shield pivotally connected to the sides of the pan and extending across the front of the pan, said shield being open across the back and having side and front portions converging upwardly to a point above the pan; and a flanged edge formed upon the shield to engage the adjacent edge of the body.

3. A bed pan comprising a body portion; a seat extending across the rearward portion of the body; a shield pivotally connected to the sides of the pan and extending across the front of the pan, said shield being open across the back and having side and front portions converging upwardly to a point above the pan and fully closing the front of said pan; a flanged edge formed upon the shield to engage the adjacent edge of the body; and a handle secured upon the front of the shield in front of the pivot mounting of the shield whereby the shield and body are held in closed relation by the weight of the pan when the pan is lifted by said handle.

GRACE ANNA BURD.